(No Model.)
S. THOMPSON.
HORSESHOE AND PAD.
No. 400,514. Patented Apr. 2, 1889.
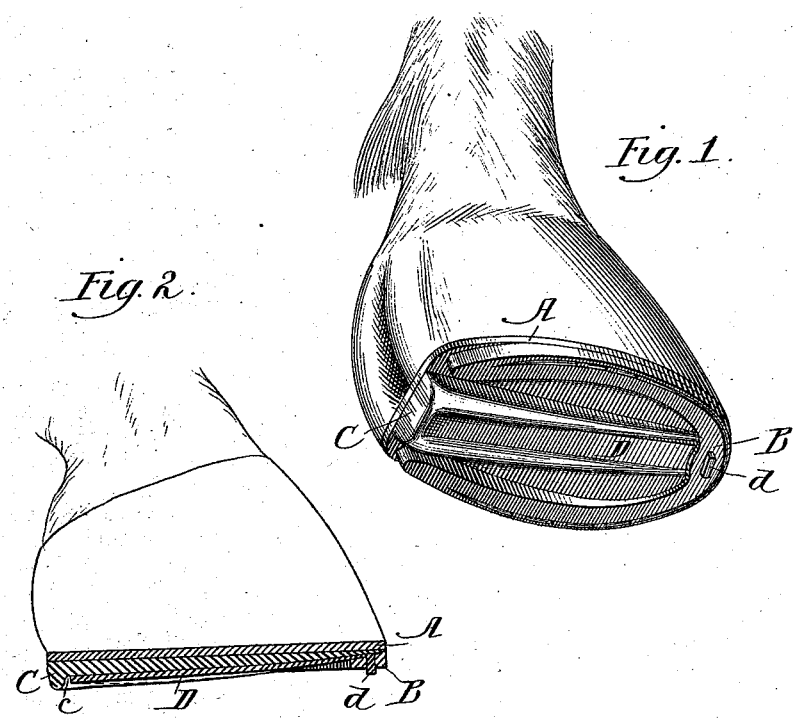
Witnesses,
H. B. Hallock.
Louis S. Thomason.
Inventor.
Samuel Thompson
By his Attorney
Frank D. Thomason

UNITED STATES PATENT OFFICE.

SAMUEL THOMPSON, OF CHICAGO, ILLINOIS.

HORSESHOE AND PAD.

SPECIFICATION forming part of Letters Patent No. 400,514, dated April 2, 1889.

Application filed March 24, 1888. Serial No. 268,440. (No model.)

*To all whom it may concern:*

Be it known that I, SAMUEL THOMPSON, of Chicago, in the county of Cook and State of Illinois, have invented certain new and useful Improvements in Horseshoes and Pads, of which the following is a full, clear, and exact description, reference being had to the accompanying drawings, and to the letters of reference marked thereon.

The object of my invention is to provide a simple yet perfect pad for the soles of horses' hoofs, which protects and supports the frog of the hoof, prevents excessive moisture, and at the same time prevents slipping, substantially as hereinafter fully described, and as illustrated in the drawings, in which—

Figure 1 is a perspective view of a horse's hoof, showing my improvements applied to the sole thereof. Fig. 2 is a transverse vertical section of the same.

Referring to the drawings, A represents a leather sole, which is intervened between the shoe B and the sole of the hoof and secured to the latter, as shown, by the same nails or means that secure said shoe to said hoof. The contours of this sole A correspond to those of the sole of the hoof and completely cover the same. The frog of the hoof therefore rests upon this sole, and were it not for the fact that I provide an artificial frog the hoof would lack that cushion which the frog provides for the horse in the ordinary act of stepping. This artificial frog consists of a pad, C, which is placed lengthwise on sole A, so that its forward end, which is tapered to a very thin thickness, is secured under the tip of the shoe. Its rear end, which extends centrally between the ends of the shoe, is of such thickness that it projects from said sole A a distance corresponding to or slightly greater than the thickness of the end of the shoe. This pad is made of rubber or some other elastic material, and is secured in place by a bar, D, which is secured at its front end under the tip of the shoe B by means of a projecting lug, $d$, from its forward end, which passes through a suitable opening in the said tip. The remainder of its length, which extends to about the rear of the hoof, as shown, rests within a corresponding depression or longitudinal groove, $c$, in said pad, and by reason of the upward pressure, which is created by fastening the same under the tip of the shoe, as before explained, holds said pad firmly in position.

I may desire sometimes to rivet the rear end of bar D to the pad itself, instead of leaving said end entirely unfastened, as hereinbefore explained. I wish, therefore, to be considered as covering such a mode of fastening. Should I adopt such fastening devices, I might dispense with separate fastening devices at its forward end, and simply secure it by securing the shoe down over it, as shown in the drawings.

What I claim is—

1. The combination, with a horseshoe, of a pad of elastic material the edges of which extend and are secured between the shoe and hoof and which is provided with a frog that projects down between the heels of the shoe to a plane below that of the bearing-surface thereof, and the projection of which gradually diminishes as said frog approaches the toe, and a spring-bar, D, secured to the toe of the shoe next the hoof and extending longitudinally to and terminating under the heel of the hoof, said bar having no other connection to said shoe except at the toe thereof and pressing upward against the frog of said pad to support the same, as set forth.

2. The combination, with a horseshoe and a leather sole secured between said shoe and the hoof, of an artificial frog of elastic material, the front end of which reaches to or under the toe of the shoe, and which gradually increases in thickness as it extends longitudinally from the toe to between the heels of said shoe until it depends at the heel to a plane below that of the tread of said shoe, and a spring-bar which is secured next the hoof to the toe of shoe and which extends to the rear, resting within a longitudinal depression or groove in the outer surface of said frog, which it holds rigidly in place.

SAMUEL THOMPSON.

Witnesses:
A. M. THOMASON,
LOUIS S. THOMASON.